United States Patent
Eppler et al.

(10) Patent No.: US 7,885,025 B2
(45) Date of Patent: Feb. 8, 2011

(54) GENERATING PES USING READBACK SIGNAL DISTORTION

(75) Inventors: Walter Richard Eppler, Cranberry Township, PA (US); Inci Ozgunes, Pittsburgh, PA (US); Xiangjun Feng, Wexford, PA (US); Kevin Arthur Gomez, Wexford, PA (US); Mark David Bedillion, Allison Park, PA (US); Stephen John Wrazien, Cranberry Township, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 162 days.

(21) Appl. No.: 12/255,776

(22) Filed: Oct. 22, 2008

(65) Prior Publication Data

US 2010/0097714 A1  Apr. 22, 2010

(51) Int. Cl.
G11B 20/10 (2006.01)
(52) U.S. Cl. .................. 360/39; 360/77.06
(58) Field of Classification Search ............... None
See application file for complete search history.

(56) References Cited

U.S. PATENT DOCUMENTS

| 4,589,037 | A | 5/1986 | Jen et al. ............... 360/77 |
| 5,831,888 | A | 11/1998 | Glover ................ 364/807 |
| 6,108,153 | A | 8/2000 | Glover ................ 360/51 |
| 6,154,335 | A * | 11/2000 | Smith et al. ............. 360/75 |
| 6,567,489 | B1 | 5/2003 | Glover ................ 375/376 |
| 6,657,809 | B2 * | 12/2003 | Ottesen et al. .......... 360/77.03 |
| 7,245,449 | B2 * | 7/2007 | Stein et al. ............. 360/65 |
| 7,307,808 | B2 * | 12/2007 | Kaizu et al. ............ 360/75 |

FOREIGN PATENT DOCUMENTS

EP           020805 A2    3/1986

* cited by examiner

*Primary Examiner*—Jason C Olson
(74) *Attorney, Agent, or Firm*—Alan G. Rego; Westman, Champlin & Kelly, P.A.

(57) ABSTRACT

A data storage system includes a storage medium having a plurality of data sectors and a head that communicates with the data storage medium. The head produces a readback signal when reading information from the data storage medium. A computation unit extracts a distortion component of the readback signal and generates a position error signal from the distortion component.

20 Claims, 6 Drawing Sheets

GENERATING PES USING READBACK SIGNAL DISTORTION

BACKGROUND

The present aspects generally relate to data storage systems, and more particularly to generating position error signals using readback signal distortion in data storage devices such as disc drives.

Mass storage devices are one of many components of modern computers. One type of mass storage device is a disc drive. In general, disc drives read and write information along concentric tracks formed on discs. A magnetic disc drive, which is a particular type of disc drive, includes one or more magnetic discs mounted for rotation on a hub or spindle. A typical magnetic disc drive also includes a head that flies above each magnetic disc. An actuator moves the head radially over the disc surface for track seek operations and holds the head directly over a track on the disc surface for track following operations.

Information is typically stored in concentric tracks on the surface of a magnetic disc by providing a write signal to the head to encode flux reversals on the surface of the magnetic disc representing the data to be stored. In retrieving data from the disc, the drive controller controls the actuator so that the head flies above the magnetic disc, sensing the flux reversals on the magnetic disc, and generating a readback signal based on those flux reversals. The readback signal is typically conditioned and then decoded by a drive channel and controller to recover data represented by flux reversals stored on the magnetic disc.

A typical disc drive read channel includes the head, signal conditioning circuitry (such as amplification and filtering) and data detection circuits. Error detection and correction is typically performed by the drive controller.

To locate a particular track on a disc, disc drives typically use embedded servo fields on the disc. Thus, a typical disc format comprises "pie-shaped" wedges of servo information interweaved between sections of data. The embedded servo fields are utilized by a servo sub-system to position a head over a particular track. During track following, servo information sensed by the head is demodulated to generate a position error signal (PES) which provides an indication of the radial distance between the head and the track center. The PES is then converted into an actuator control signal, which is used to control the actuator that positions the head.

A fundamental barrier to improved servo performance in disc drives is a servo sampling rate limitation due to format efficiency. The disc/servo format affects both the sampling rate of a digital control system and its sensing noise. When moving to higher track densities, the sampling rate must be increased and the sensing noise diminished. Increasing the sampling rate requires increasing the number of servo sectors on the disc, and decreasing sensing noise requires increasing the size of each servo sector. Together, these effects diminish format efficiency in disc drives.

The present aspects address these problems and offer other advantages over the prior art.

SUMMARY

An aspect of the disclosure relates to generating position error signals using readback signal distortion.

In one apparatus aspect, a data storage system includes a storage medium having a plurality of data sectors and a head that communicates with the data storage medium. The head produces a readback signal when reading information from the data storage medium. A computation unit extracts a distortion component of the readback signal and generates a position error signal from the distortion component.

In another apparatus aspect, a circuit includes a first input that receives a readback signal from a head, and a second input that receives a data detector output. A computation unit utilizes the readback signal and the data detector output to derive a distortion component of the readback signal and generates a position error signal from the extracted distortion component.

In a method aspect, a distortion component of a readback signal is extracted, and a position error signal is generated from the distortion component.

These and various other features and advantages will become apparent upon reading the following detailed description and upon reviewing the associated drawings.

BRIEF DESCRIPTION OF THE DRAWINGS

FIG. 4-2 is a diagrammatic illustration of portion of a track that has data sectors and servo sectors, with sacrificial servo information included in the data sectors.

DETAILED DESCRIPTION

Figure 1A:
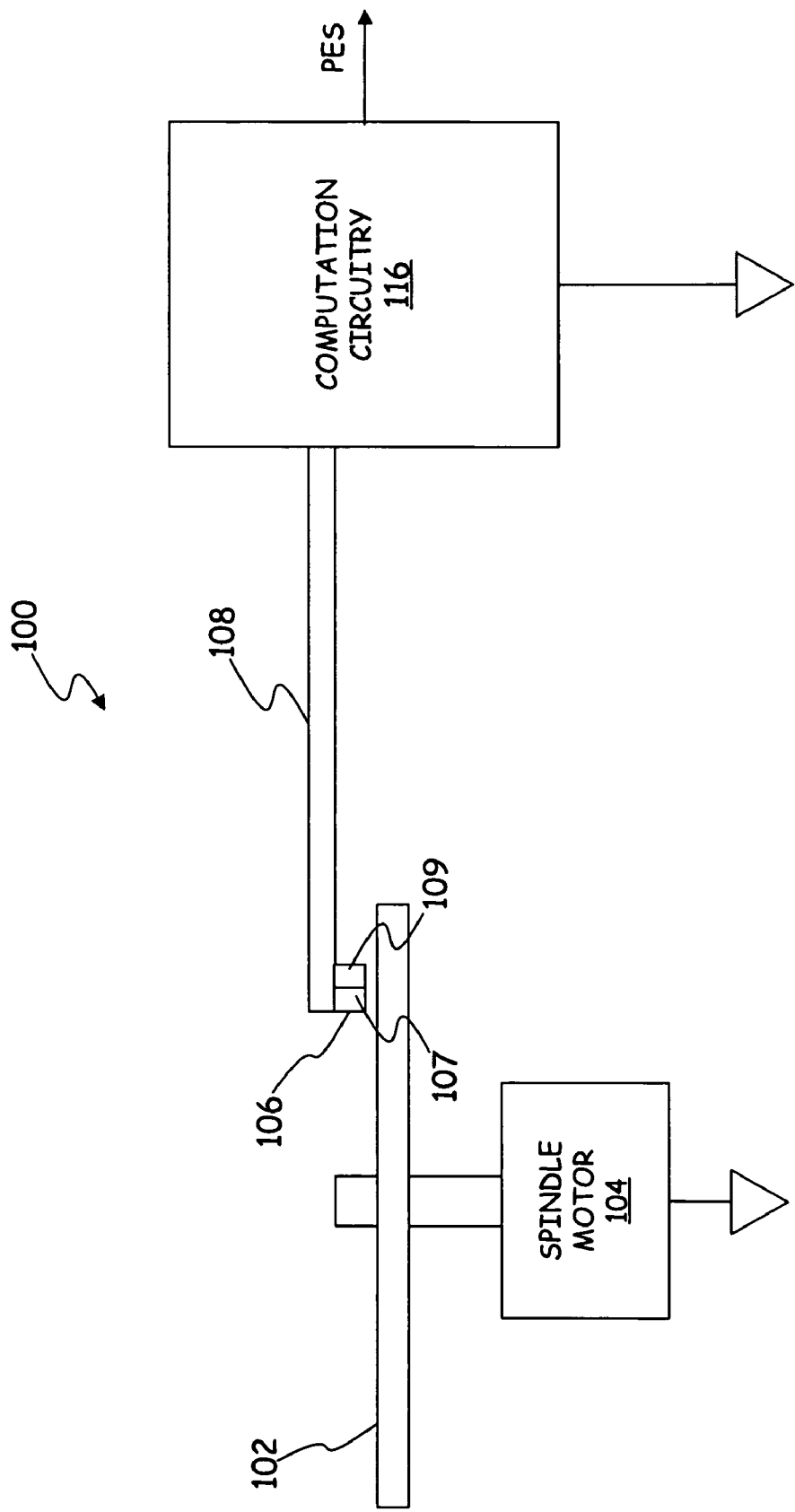
FIG. 1A is a simplified block diagram of a data storage system in accordance with one exemplary aspect.

FIG. 1A is a simplified block diagram of a data storage system 100 in accordance with one exemplary aspect. Data storage system 100 includes a data storage medium 102, which is rotated with the help of spindle motor 104. A head 106 that communicates with the data storage medium 102 is also included in system 100. Head 106 is operably coupled to an actuator 108. Data storage system 100 reads and writes information along concentric tracks formed on data storage medium 102 with the help of head 106, which includes a readback sensor 107 and a write transducer 109. During a read operation, an analog readback signal produced by the readback sensor 107 is processed by read channel circuitry (not shown in FIG. 1A) that produces decoded bit estimates from the analog readback signal.

Figure 1B:
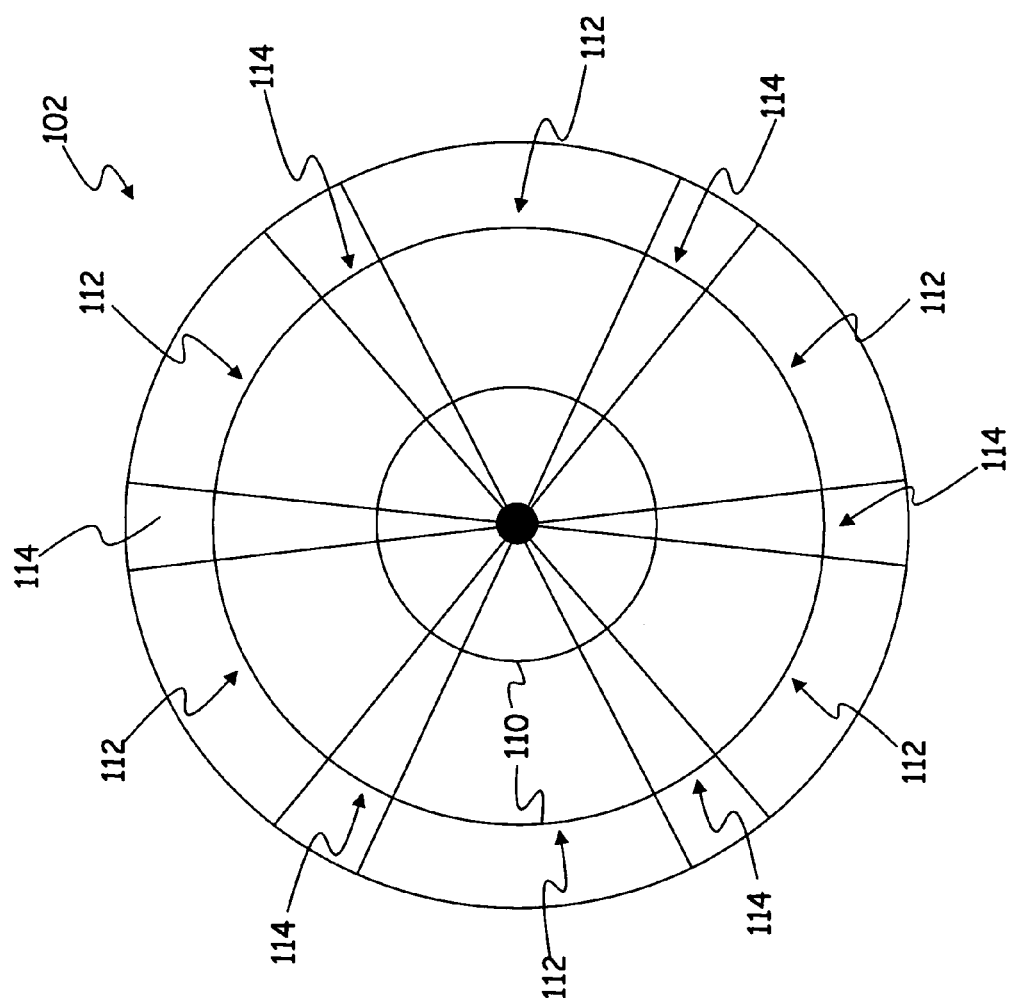
FIG. 1B is a diagrammatic illustration of a surface of a data storage medium.

To locate a particular track on data storage medium 102, data storage system 100 uses embedded servo fields on the disc. FIG. 1B shows a surface of data storage medium 102, which is in the form of a disc that includes concentric tracks 110 with data fields 112 and servo fields 114, for example. In FIG. 1B, only two tracks are shown in the interest of simplification. However, a typical disc surface includes a very large number of closely spaced tracks. The embedded servo fields 114 are utilized by a servo sub-system (not shown) to position head 106 over a particular track. During track following, servo information sensed by head 106 is demodulated to generate a position error signal (PES) which provides an indication of the distance between the head and the track center. The PES is then converted into an actuator control signal, which is used to control actuator 108, which positions head 106.

In accordance with one aspect, the readback signal produced by head 106 when reading data fields 112 is also used to extract head position information. In accordance with the specific aspect shown in FIG. 1A, a computation unit 116, which communicates with head 106, extracts a distortion component of the readback signal and generates a PES from the distortion component. Example implementations of computation unit 116 are described further below. In general, PES obtained form a distortion component of a readback signal can be utilized in a data storage system such as 100. A specific method for obtaining a distortion component of a readback signal and generating a PES from the distortion component is described below.

It has been shown that provided the readback sensor's transfer function is singular valued (i.e. it does not exhibit hysteresis and is mildly nonlinear (i.e. all derivatives of the transfer function up to order L, the memory length of the system, exist)) then the readback signal can be completely represented by a finite length Volterra Series of the form $$y(t) = y^{(0)}(t) + \sum_k a_k C^{(1)}(t-kT) +$$
$$\sum_k \sum_{d_1=1}^{L-1} a_k a_{k-d_1} C_{d_1}^{(2)}(t-kT) +$$
$$\sum_k \sum_{d_1=1}^{L-2} \sum_{d_2=d_1+1}^{L-1} a_k a_{k-d_1} a_{k-d_2} C_{d_1,d_2}^{(3)}(t-kT)$$
$$\vdots +$$
$$\sum_k \sum_{d_1=1}^{L-l-1} \cdots \sum_{d_l=d_{l-1}+1}^{L-1} a_k a_{k-d_1} \cdots$$
$$a_{k-d_l-1} C_{d_1,d_2,\ldots,d_{l-1}}^{(l)}(t-kT) +$$
$$\sum_k a_k a_{k-1} \cdots a_{k-(L-1)} C_{1,2,\ldots,L-1}^{(L)}(t-kT)$$

Equation 1 where $a_k = \pm 1$ are the recorded bits in non-return to zero (NRZ) format, l is the order of the Volterra kernels and $C^{(l)}(t)$, l=1, 2, ..., ; L are the Volterra kernels which characterize the system. The $C_1^{(2)}(t)$ kernel for giant magneto-resistive (GMR) readback sensors, which are a particular type of readback sensor, varies as a function of cross-track position. If the GMR sensor is reasonably linear when on track, then the $C_1^{(2)}(t)$ kernel will be positive when the head is off-track in one direction, cross zero when the head is on-track, and be negative when the head is off-track in the opposite direction. This behavior is shown by the changes in the echo amplitude located at channel bit 30.5 for the dibit response shown in FIG. 2. This is a natural consequence of the in-plane field from the media modulating the sensitivity or gain of the readback sensor as the head moves off track. If the readback sensor naturally has a large second order nonlinearity, then this will add a constant term offsetting the zero crossing of the kernel from track center.

The read channel output (bit estimates) can be used in a straightforward implementation of the Volterra Series to provide an estimate of the second order partial response $y_1^{(2)}(t)$ from the $a_k a_{k-1}$ interaction $$y_1^{(2)}(t) = \sum_k a_k a_{k-1} C_1^{(2)}(t-kT).$$

Equation 2

Figure 3:
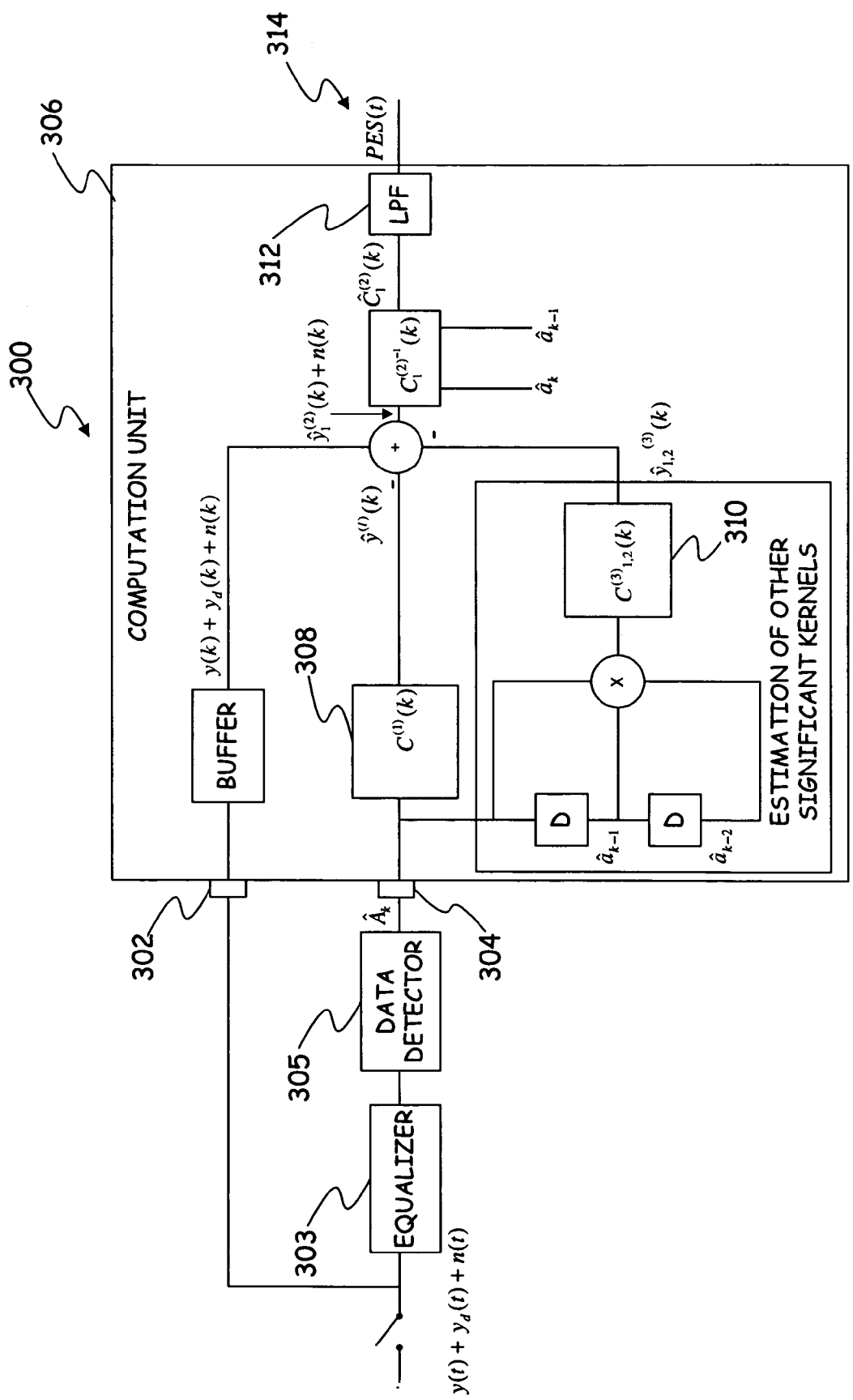
FIG. 3 is a diagrammatic illustration of a demodulation circuit for providing position error signals in accordance with one aspect.

A block diagram of such an estimator for a channel with $C_1^{(2)}(t)$ and $C_{1,2}^{(3)}(t)$ kernels is shown in FIG. 3. In general, FIG. 3 is a diagrammatic illustration of a circuit 300 that receives the readback signal, extracts a distortion component of the received readback signal, and generates a PES from the extracted distortion component in accordance with a specific aspect. The circuit of FIG. 3 includes a first input 302 that receives a readback signal from a head (not shown in FIG. 3), and a second input 304 that receives a data detector (for example, a Viterbi detector) output. Equalizer 303 and data detector 305 are a part of a read channel in a data storage system. A computation unit 306 utilizes the readback signal and the data detector output to derive a distortion component of the readback signal and generates a position error signal from the extracted distortion component. However, as noted above, in the specific implementation shown in FIG. 3, computation unit 306 is an estimator for a channel with $C_1^{(2)}(t)$ and $C_{1,2}^{(3)}(t)$ kernels. After an appropriate training sequence to identify the filters ($C^{(1)}(t)$ and $C_{1,2}^{(3)}(t)$, which are denoted by reference numerals 308 and 310, respectively, in FIG. 3) corresponding to all significant kernels other than the second order kernel $C_1^{(2)}(t)$, the corresponding partial responses can be subtracted from an appropriately delayed version of the input waveform to obtain an estimate of the second order partial response. By solving the identification problem $$\sum_k \hat{a}_k \hat{a}_{k-1} C_1^{(2)}(k) = \hat{y}_1^{(2)}(k) + n(k)$$

Equation 3 using the data sequence $\hat{a}_k \hat{a}_{k-1}$ and low pass filtering (with the help of low pass filter (LPF) 312 in FIG. 3), a waveform (PES(t) 314 in FIG. 3) with amplitude proportional to the distance the head is off-track is formed.

By utilizing PES generated from both servo sectors (such as 114 of FIG. 1B) and data sectors (such as 112 of FIG. 1B), the above-described aspects increase the position sampling rate during read operations. In general, benefits of high-rate position sampling include:

1.) Improved track follow performance. Increased servo sampling rate reduces the amount of phase loss in the system and hence improves performance. It also provides a means of compensating high-frequency plant modes (i.e. sway).
2.) Improved post-seek write-gate decision making. Currently, a drive usually waits for several servo measurements to be within bounds before write-gate is raised. High-rate information allows decisions to be made within a shorter amount of time.
3.) Improved diagnostic tools for servo controller design and performance analysis. High-rate sampling could improve plant models used for controller design, which are critical for studying the performance of the sampled-data control system. High-rate information, which can come about through the use of digital design tools on the sampled-data system, can also be used to study inter-sample motion of a traditional servo system.
4.) Ability to detect external shock and self-induced shock events. Currently, external shock sensors are used to disable writes during shock events, but with sufficient sampling rate, PES could fill that role. In particular, self-induced shock event detection would greatly benefit from high-rate head position information since the self-induced shock events typically have higher frequency signatures.

5.) Enabling a direct tradeoff between detection noise and sampling rate. In a high rate system, multiple PES measurements may be combined to produce a low-noise position estimate at a lower rate. This could be advantageous, for instance, in benefit 2.). In fact, the tradeoff between sampling rate and noise could be done on-the-fly in the drive to adjust for different disturbance environments, for instance, or to aid in retries.

As noted earlier, the above-described solution increases the servo/position sampling rate during readback. Extensions to benefit the write case are discussed further below. In addition to the high rate sampling benefits, the proposed solution has the benefit that its position information is measured relative to data itself, rather than to pre-formatted PES. Even if a PES position stamp were recorded for every data sector written (which would represent an unaffordable format overhead), the servo system has no way of knowing the actual position of data between servo sectors.

A high sample rate servo signal will serve to improve the robustness of the read process—allowing a high bandwidth actuator to better follow runout in the data sector that exists between servo wedges. This can either be used continuously or to significantly improve the read recovery process. A typical read recovery process involves incrementally varying position offsets and channel parameters in an attempt to recover a complete sector. Using this technique, offsets may be applied in the correct sign and magnitude to re-center on data. In addition, it would make feasible correction schemes which would feed forward higher order, non-direct current (DC) offsets.

Figure 2:
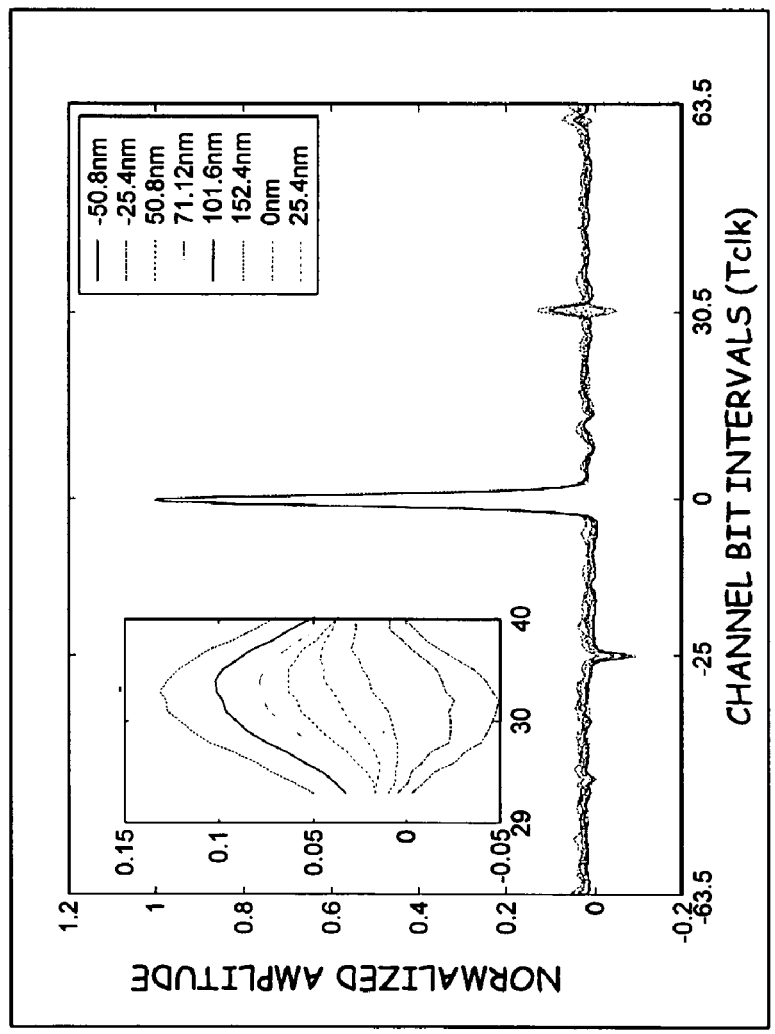
FIG. 2 is a plot showing a dibit response.
Figures 1, 4:
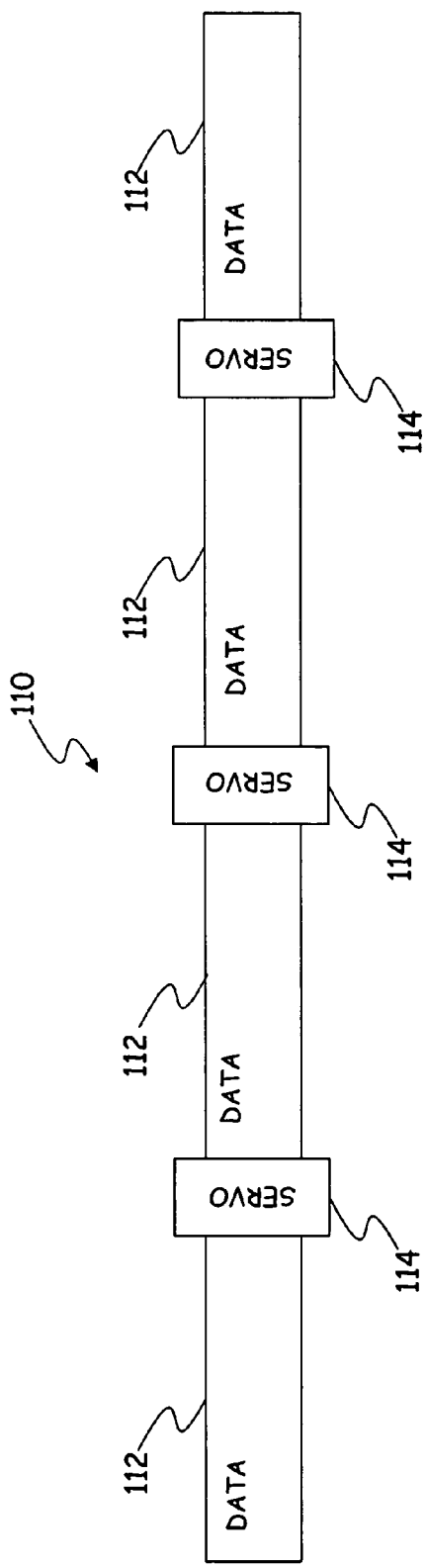
FIG. 4-1 is a diagrammatic illustration of portion of a track that has data sectors and servo sectors, with no servo information in the data sectors.
Figures 2, 4:
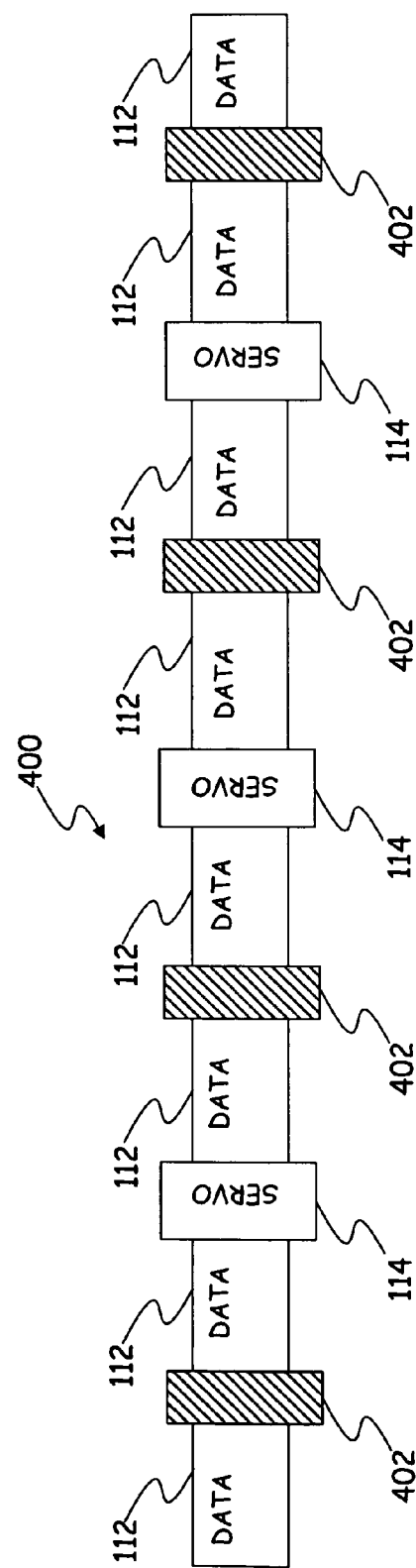

A more insidious issue is creeping servo format inefficiency which cannot be enhanced by solely improving the read sample rate without also improving the write sample rate. One possible approach to enhancing servo format efficiency with this scheme involves increasing the system sample rate (for example, double the sample rate) by embedding servo position wedges, which serve as both servo and data, between regular servo wedges. FIG. 4-1 shows a track 110 with data fields 112 and servo fields 114. FIG. 4-2 shows a track 400 additional position wedges 402 embedded between data fields 112 and servo fields 114.

In one aspect, wedges 402 contain only analog position information and not track identification (ID) or grey codes, which are included in servo fields 114. Also, in order to not significantly impact performance, these servo/data wedges 402 are used for data overhead typically assigned to spare sectors—which are written on a separate pass. Specifically, in some aspects, wedges 402 are primarily useful when data fields 112 are "blank" (i.e. when the discs are manufactured and pre-written with servo information, but the data fields in the tracks are not yet written within the disc drive.) After a data field 112 on a track is written, the readback signal from the written information can be used for positioning the head, and therefore servo information within wedges 402 is essential for positioning the head only when the respective data fields 112 are not yet written in the drive. Thus, in such aspects, wedges 402 contain sacrificial servo information that can be overwritten with data in the drive. In other aspects, "junk" information is written on wedges 402 in the factory to supply positioning capability that enables initial data writing in the field. Once field data are written, user data can be used to position the head while re-writing the 402 regions with infrequently accessed system information. This effectively increases the sampling rate in substantially all scenarios without a format efficiency hit.

The above-described aspects relate to data storage systems that utilize discs in which embedded servo information defines tracks on the discs. Such discs do not have discrete tracks. The following aspects relate to data storage systems that employ discrete track media in which the tracks are actually physical (for example, lithographically defined). A disc drive employing discrete track media must have a means for; sensing the position of the recording head relative to the track of interest, positioning the head over the track of interest, and following the pre-patterned track of interest as the disc rotates. This could be accomplished using the existing embedded sectored servo system by patterning portions of each track to provide a signal proportional to the relative distance of the recording head to the track center. The patterning in the regions providing the position error signal must be offset from the track center and further magnetized. The pre-patterned position error is minimized only by tight control of the mastering replication and disc fabrication processes. Furthermore, bulk magnetization of the servo regions will result in DC content to the signal in the servo regions while the data regions will be quasi DC free. Current recording heads are alternating current (AC) coupled and thus the recording system must either anticipate and cancel the large transient, which will be present at the transition between the two regions, or dedicate further overhead to provide time for the transient to decay. Thus, employing embedded sectored servo in a physically patterned disc is problematic. Therefore, in one aspect, position error signals are generated using readback signal distortion in systems with discrete track media, which, for reasons provided below, eliminates a need for using embedded sectored servo in a physically patterned disc.

The description provided earlier in connection with FIG. 1B relates to embedded servo systems where servo fields (such as 114 of FIG. 1B) include complex servo information. However, in systems with discrete track media, tracks 110 are discrete tracks with servo wedges (such as 114) including only a certain frequency tone, which is a very simple repetitive pattern. During operation, that simple pattern is demodulated to provide position information. Of course, the position information from the position wedges can be augmented with position information extracted from the data signal (readback signal from the data fields). In general, the techniques described above in connection with embedded servo systems also apply to systems with discrete track media. However, in systems with discrete track media, the servo wedge demodulation is also carried out using readback signal distortion.

Figure 5:
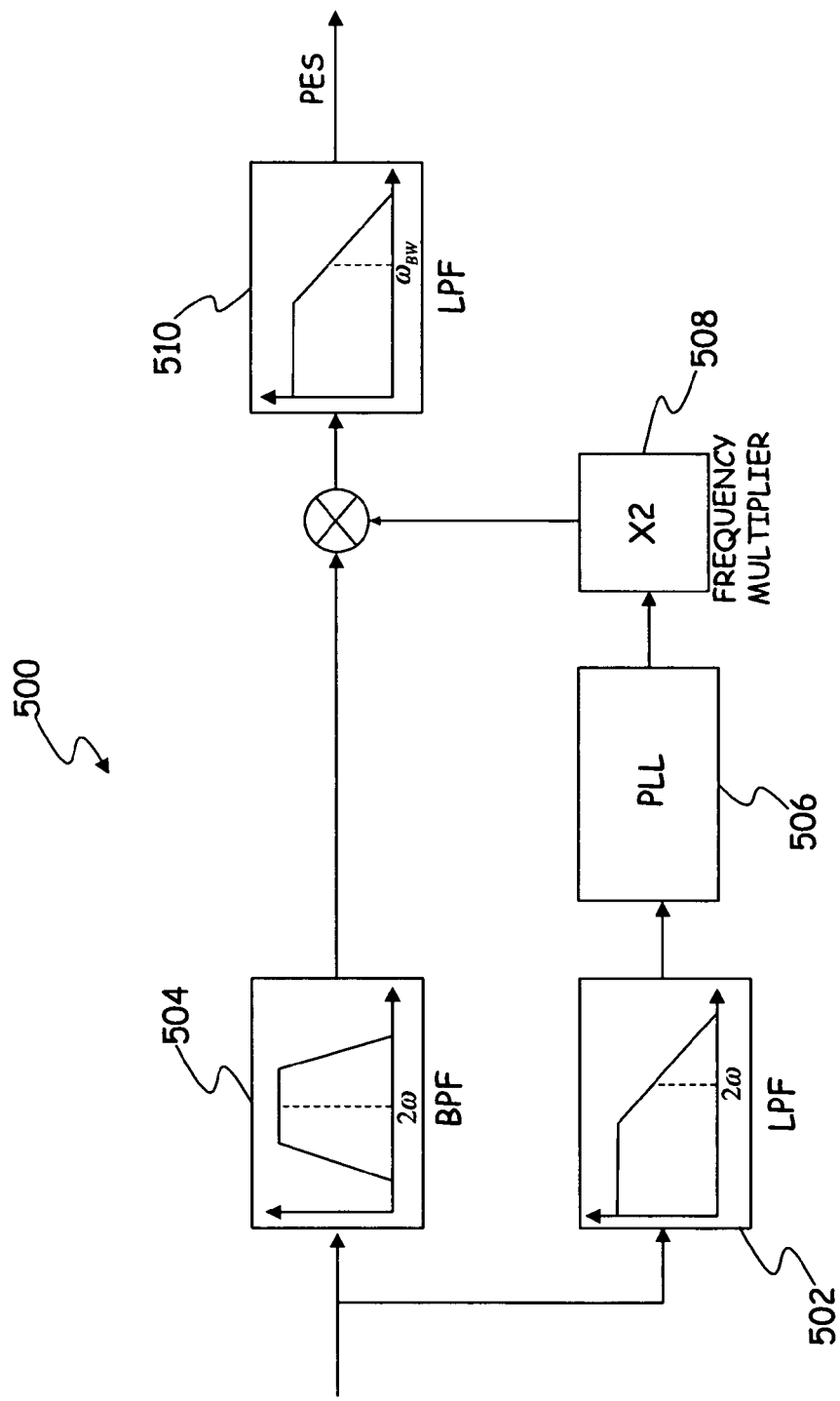
FIG. 5 is a diagrammatic illustration of a demodulation circuit for providing position error signals in a discrete track data storage system.

In an example aspect, a square wave pattern is written to the portion of the tracks dedicated to the position error detection, and demodulation is accomplished by detection of the signal component at twice the frequency of the written pattern. A block diagram of a position error demodulation circuit 500 is shown in FIG. 5. A signal is separated into its fundamental and first harmonics via a low pass filter 502 and a band pass filter (BPF) 504. A clock signal in phase with the fundamental frequency is generated by a phase locked loop (PLL) 506. The frequency of the clock signal is doubled (using frequency multiplier 508) and mixed with the signal from the band pass filter 504. The mixing produces a bipolar signal at DC proportional to the amplitude of the off-track position of the read head. The mixed signal is sent to a second low pass filter 510, which outputs the PES.

It is to be understood that even though numerous characteristics and advantages of various aspects have been set forth in the foregoing description, together with details of the structure and function of various aspects, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular type of data storage system in which position error signals have to be generated without departing from the spirit and scope of the present disclosure.

What is claimed is:

1. A method comprising:
   extracting, by a computation unit, a distortion component of a readback signal from the readback signal and a data detector output; and
   generating a position error signal from the distortion component.

2. The method of claim 1 wherein extracting the distortion component of the readback signal comprises:
   representing the readback signal by a finite length Volterra series; and
   utilizing the finite length Volterra series representation of the readback signal to determine the distortion component of the readback signal.

3. The method of claim 2 wherein utilizing the finite length Volterra series representation of the readback signal to determine the distortion component of the readback signal comprises:
   computing a value for a second order Volterra kernel in the finite length Volterra series; and
   obtaining the distortion component of the readback signal from the second order Volterra Kernel value.

4. The method of claim 1 wherein the readback signal is generated by a head during a read operation on a data sector between servo sectors on a data storage medium.

5. The method of claim 1 wherein the readback signal is generated by a head while sensing a pattern on a servo wedge on a discrete track medium.

6. The method of claim 4 and further comprising writing sacrificial servo information in at least a portion of the data sector in addition to writing servo information in the servo sectors.

7. A circuit comprising:
   a first input configured to receive a readback signal from a head;
   a second input configured to receive a data detector output; and
   a computation unit configured to utilize the readback signal and the data detector output to derive a distortion component of the readback signal and to generate a position error signal from the extracted distortion component.

8. The circuit of claim 7 wherein the computation unit comprises at least one filter to help extract the distortion component of the readback signal.

9. The circuit of claim 7 wherein the readback signal is represented by a finite length Volterra series.

10. The circuit of claim 8 and wherein the at least one filter corresponds to a kernel of a finite length Volterra series.

11. The circuit of claim 7 and wherein the data detector output is a Viterbi detector output.

12. A data storage system comprising:
    a storage medium having a plurality of data sectors;
    a head that communicates with the data storage medium, the head configured to produce a readback signal when reading written information from the data storage medium; and
    a computation unit configured to extract a distortion component of the written information readback signal and to generate a position error signal from the distortion component.

13. The data storage system of claim 12 wherein the computation unit is configured to extract the distortion component of the readback signal by:
    representing the readback signal by a finite length Volterra series; and
    utilizing the finite length Volterra series representation of the readback signal to determine the distortion component of the readback signal.

14. The data storage system of claim 13 wherein the computation unit is configured to utilize the finite length Volterra series representation of the readback signal to determine the distortion component of the readback signal by:
    computing a value for a second order Volterra kernel in the finite length Volterra series; and
    obtaining the distortion component of the readback signal from the second order Volterra Kernel value.

15. The data storage system of claim 12 wherein the readback signal is generated by a head during a read operation on at least one data sector of the plurality of data sectors on the data storage medium.

16. The data storage system of claim 12 wherein the data storage medium further comprises a plurality of servo sectors interweaved between the plurality of data sectors.

17. The data storage system of claim 16 wherein the data storage medium further comprises sacrificial servo information within at least one of the plurality of data sectors.

18. The storage system of claim 16 wherein the readback signal is generated by a head during a read operation on at least one data sector of the plurality of data sectors on the data storage medium.

19. The data storage system of claim 12 wherein the data storage medium is a discrete track medium having a plurality of servo wedges interweaved between the plurality of data sectors.

20. The data storage medium of claim 19 wherein the readback signal is generated by the head while sensing a pattern on a servo wedge of the plurality of servo wedges on the discrete track medium.

* * * * *